United States Patent Office 3,173,886
Patented Mar. 16, 1965

3,173,886
POLYMERIC HETEROCYCLIC AMIDES, CONTAINING PHOSPHORUS AND A 5,5' BIBENZ-IMIDAZOLE
Robert Z. Greenley, Hazelwood, Mo., and Morris L. Nielsen, Dayton, Ohio, assignors to Monsanto Research Corporation, St. Louis, Mo., a corporation of Delaware
No Drawing. Filed Jan. 29, 1962, Ser. No. 169,676
17 Claims. (Cl. 260—2)

This invention relates to polymeric heterocyclic amides of phosphorus acids and to methods of preparing the same, and more particularly provides new and valuable polymers of certain heterocyclic phosphorus amides and new benzimidazole compounds from which the polymeric amides are prepared.

An object of the invention is to prepare highly heat-resistant polymeric compounds. Another object of the invention is the provision of polymers having very good resistance to solvents. Still another object of the invention is the provision of moldable compositions having high thermal stability. A further object of the invention is the provision of a heterocyclic nitrogen reactant of particular utility for the preparation of moldable and extrudable polymers of high stability to heat and solvents.

These and other objects of the invention hereinafter defined are provided by the invention wherein there are prepared high molecular weight polymers by the reaction of an organic dihalophosphorus compound with a 5,5'-bibenzimidazole compound substantially according to the scheme:

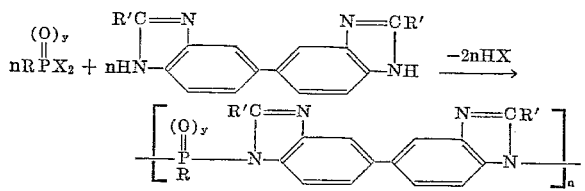

where R is selected from the class consisting of hydrocarbon radicals which are free of olefinic and acetylenic unsaturation and contain from 1 to 12 carbon atoms and (hydrocarbon)$_2$N- where the hydrocarbon radical is as herein defined, y is zero or one, X is selected from the class consisting of bromine and chlorine and R' is selected from the class consisting of hydrogen and alkyl radicals of 1 to 5 carbon atoms.

The presently useful dihalophosphorus compound may be a hydrocarbonphosphonic dichloride or dibromide, i.e., a compound of the formula

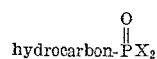
hydrocarbon-PX$_2$

Examples of such dichlorides or dibromides are methyl-, ethyl-, propyl-, butyl-, pentyl-, hexyl-, heptyl-, octyl-, phenyl-, α- or β-naphthyl-, o-, m- or p-biphenylyl-, o-, m- or p-tolyl-, xylyl-, cyclopropyl-, cyclopentyl-, cyclohexyl-, or benzylphosphonic dichloride or dibromide.

The useful dihalides may also be hydrocarbon-phosphonous dihalides, i.e., compounds of the formula

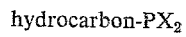
hydrocarbon-PX$_2$ e.g., methyl-, isopropyl-, pentyl-, 2-ethylhexyl-, dodecyl-, phenyl-, naphthyl-, cyclohexyl-, biphenylyl-, pentamethylphenyl-, or benzylphosphonous dichloride or dibromide.

Instead of the hydrocarbon phosphorus dihalides there may be employed N,N-dihydrocarbonphosphoramidic dihalides, i.e., compounds of the formula

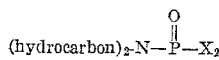
(hydrocarbon)$_2$N—P—X$_2$

Examples of such phosphoramidic dichlorides are di-methyl-, dibutyl-, diheptyl-, dioctyl-, didecyl-, ethylmethyl-, dicyclopentyl-, ethylcyclopentyl-, diphenyl-, dinaphthyl-, ethyl-p-tolyl-, butylcyclohexyl-, dodecylphenyl-, or benzylpropylphosphoramidic dichloride or dibromide.

The useful phosphorus dihalides may also be dihydrocarbonphosphoramidous dichlorides or dibromides, i.e., compounds of the formula

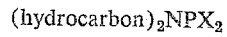
(hydrocarbon)$_2$NPX$_2$

Examples thereof are dimethyl-, dipropyl-, dioctyl-, didodecyl-, butylpentyl-, diphenyl-, phenyl-p-tolyl-, bis(2-phenylethyl), dicyclohexyl-, dodecylphenyl-, bis(4-hexylphenyl)-, or butyl-α-naphthylphosphoramidous dichloride or dibromide.

The bibenzimidazole reactants are previously unknown compounds which are obtained by the reaction of 3,3',4,4'-biphenyltetramine with a monocarboxylic acid substantially according to the scheme:

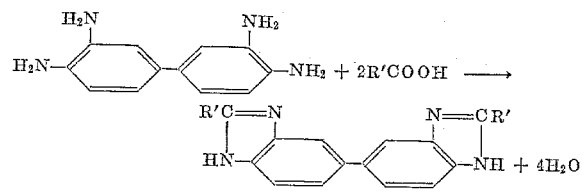

where R' is hydrogen or an alkyl radical of from 1 to 5 carbon atoms.

There are thus provided, e.g., 5,5'-bibenzimidazole by reaction of the tetramine with formic acid; 2,2'-dimethyl-5,5'-bibenzimidazole from the tetramine and acetic acid; 2,2'-diethyl-5,5'-bibenzimidazole from the tetramine and propionic acid, or 2,2'-dipropyl-5,5'-bibenzimidazole from the tetramine and butyric acid. Similarly the use of valeric acid or hexanoic acid as the carboxylic acid constituent yields 2,2'-dibutyl- or 2,2'-dipentyl-5,5'-bibenzimidazole.

Reaction of the biphenyltetramine with the carboxylic acid takes place by simply heating the two reactants at, say, a temperature of from 60° C. to 200° C., preferably at reflux, at ordinary, decreased or increased temperature and in the presence of an inert organic liquid as diluent. A catalyst may or may not be employed. When no diluent is used and the carboxylic acid is substantially anhydrous, a catalyst is quite unnecessary, although the use of a catalyst will often accelerate the reaction and thereby permit a substantially shorter heating time. Inorganic mineral acids or acidic salts thereof are particularly useful as catalysts for the reaction, and a convenient method of operation involves working with an inorganic salt of the tetramine in the presence of the salt-forming mineral acid, e.g., the tetramine tetrahydrochloride is reacted in the presence of hydrochloric acid as catalyst, or the tetrasulfate is reacted in the presence of sulfuric acid as catalyst.

Inasmuch as the 5,5'-bibenzimidazole is formed by reaction of one mole of the tetramine with two moles of the carboxylic acid, the two reactants are advantageously employed in such stoichiometric proportions. However, an excess of either may be employed, since any unreacted material is readily separated from the desired 5,5'-bibenzimidazole compound, e.g., by distillation, solvent extraction, etc. The reaction results in formation of water as by-product; hence, the reaction is conveniently and efficiently conducted by working at temperatures which permit volatilization of the by-product water and with equipment, e.g., a water trap, which permits removal of the water as it is formed. To facilitate removal of the water, the reaction may also be conducted in the presence of an organic diluent which forms an azeotrope with water, e.g., toluene or xylene. Other solvents or diluents which may be employed are, e.g., hexane, hexachloroethane, acetone, nitrobenzene, dioxane, dimethylformamide, dimethyl sulfoxide, etc.

The 5,5'-bibenzimidazoles are stable, high-melting compounds which are particularly valuable for the preparation of the presently provided polymeric phosphorus amides. Reaction of the bibenzimidazole compound with the organic phosphorus dihalide to give the polymers may be conducted by simply mixing the two reactants in the presence of a basic agent and allowing the mixture to stand until polymerization is completed. The reaction is generally exothermic; hence, heating is not required; however, heating is generally advantageous for the purpose of decreasing reaction time. Temperatures of from, say, 60° C. to 200° C. are thus useful. Advantageously, the reaction is conducted in the presence of an inert liquid diluent or solvent, and when such diluent or solvent is employed, operation at the refluxing temperature of the reaction mixture, at least toward the end of the reaction, is a convenient means of assuring completion of the reaction within an economically feasible length of time. Examples of suitable diluents are dioxane, benzene, xylene, hexane, acetone, carbon tetrachloride, dimethylformamide, N,N-dimethylacetamide, dimethyl sulfoxide, etc. The basic agent, which serves not only to catalyze the reaction but may also serve as hydrogen halide scavenger, may be inorganic or organic. When operating in the presence of an organic, inert diluent, an organic base is preferred. Examples of organic basic materials are, e.g., the tertiary alkylamines such as triethylamine, triamylamine or tri-tert-butylamine; the heterocyclic nitrogen bases such as N-methylmorpholine, pyridine, quinoline, or N-ethylpyrazole; quaternary ammonium compounds such as benzyltrimethylammonium methoxide or tetrabutylammonium butoxide; alkali metal alkoxides such as sodium or potassium methoxide or propoxide, etc. Since reaction occurs with evolution of hydrogen halide, it is advisable to make provision for removal of the halide as it is formed, e.g., by means of vigorous stirring and/or dephlegmation and/or by employing the basic material in an amount sufficient to serve as hydrogen scavenger, whereby the halide which is formed is removed from the reaction zone as the hydrohalide of the base. As is known to those skilled in the art, acyl halides are readily affected by moisture; for that reason in order to minimize possible hydrolysis of the phosphorus-halogen reactant, operation may be conducted in an inert atmosphere, e.g. nitrogen or argon. However, an inert atmosphere is not necessary since provision for maintaining substantially anhydrous conditions can be made by other means, e.g., by use of a drying tube. Also, under general atmospheric conditions, the mosture present will serve only to decrease the yield of polymer somewhat rather than to impede the reaction. All of the reaction variables, i.e., nature of diluent, basic agent, catalyst, temperature, pressure, etc., can be readily arrived at by easy experimentation. Since reaction is evidenced by a change in viscosity, progress of the reaction can be followed by noting these phenomenon. Thus, arrival at optimum reaction conditions is simply a matter of routine procedure by one skilled in the art. To assure complete reaction in experimental runs, it is generally recommended that the temperature of the reaction mixture be increased after the primary reaction has subsided. Completion of the reaction can then be determined by simply noting cessation in change of viscosity.

One mole of the 5,5'-bibenzimidazole compound reacts with one mole of the organic phosphorus dihalide to yield the present polymers; hence, the two reactants are advantageously employed in such stoichiometric proportions. However, an excess of either reactant may be employed, although the average molecular weight of the polymer product will generally be lower than when stoichiometric amounts are used. There may be used a mixture of two or more different phosphorus dihalides, e.g., a mixture of butylphosphonic dichloride and di-p-tolylphosphoramidic dichloride, or there may be used a mixture of two or more 5,5'-bibenzimidazoles, e.g., a mixture of 5,5'-bibenzimidazole and 2,2'-diethyl-5,5'-bibenzimidazole, to obtain polymers having various linkages dispersed more or less randomly in the polymer chain.

The presently provided polymeric heterocyclic amides of phosphorus acids range from waxy to high-melting solids. Of particular importance are those of the polymers which are solid, resinous materials. Such products are compression molded at high temperature and pressure, e.g., at temperatures of from, say, 350° F. to 600° F. and pressures of from 3,500 kg./cm.$^2$ to 20,000 kg./cm.$^2$, e.g. in anvil-type molding apparatus to give well-dimensioned, hard molded objects of high thermal stability. Molten polymers may be cast or extruded through suitable orifices. Solutions of the polymers which are obtainable under some conditions by incomplete polymerization are useful as impregnating agents and adhesives for laminates, with polymerization being completed in situ during manufacture of the laminates.

The invention is further illustrated by, but not limited to, the following examples:

*Example 1*

5,5'-bisbenzimidazole was prepared as follows: A mixture consisting of 7.0 g. (0.02 mole) of 3,3',4,4'-biphenyltetramine tetrahydrochloride, 17.4 g. (0.38 mole) of formic acid and 38 ml. of 5 N hydrochloric acid was heated at reflux for 0.5 hour. The resulting reaction mixture was poured into a mixture of 55 ml. of concentrated ammonium hydroxide and ice, and the brown solid which formed was filtered off and dissolved in methanol. After filtering the methanol solution in order to clarify it, it was evaporated to dryness and the residue was ether washed. There was thus obtained 4.0 g. (80% theoretical yield) of the substantially pure 5,5'-bibenzimidazole, M.P. 265–7° C. and analyzing as follows:

|  | Found | Calc'd for $C_{14}H_{10}N_4$ |
| --- | --- | --- |
| Percent C | 71.60 | 71.78 |
| Percent H | 4.18 | 4.30 |
| Percent N | 23.67 | 23.92 |

The 5,5'-bibenzimidazole was converted to a polymeric phosphonamide by reacting it as follows with diphenylphosphoramidic dichloride.

To a solution of 3.66 g. (0.013 mole) of said dichloride in 50 ml. of dimethylformamide there was added a solution of 3.00 g. (0.0128 mole) of 5,5'-bibenzimidazole and 2 ml. (0.0256 mole) of triethylamine in 50 ml. of dimethylformamide. The reaction was stirred under nitrogen and heated on the water bath at 90–95° C. for 1.5 hours. Heating was then continued on an oil bath at reflux (ca. 150° C.) for 2 hours. Upon cooling to room temperature the solid which had formed was filtered off to give the polymeric phosphoramide not softening at below 300° C., and consisting essentially of the repeating unit:

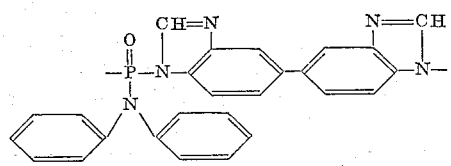

The polymer was found to be insoluble in chloroform, carbon tetrachloride, hexane, benzene, ethanol, ethyl acetate, acetone and dimethylformamide. When molded in a high pressure, high temperature Bridgman type anvil press, it was converted to give coherent smooth molded pieces of good mechanical properties; also, the molten polymer was readily cast into well-dimensioned objects or extruded through nozzles into fibers.

Example 2

A solution of 3.00 g. (0.013 mole) of 5,5′-dibenzimidazole and 2 ml. (0.0256+ mole) of triethylamine in 50 ml. of dimethylformamide was added to a solution of 2.87 g. (0.013 mole) of methylphenylphosphoramidic dichloride in 50 ml. of redistilled dimethylformamide. The whole was stirred under nitrogen and heated on the water bath for 2 hours at 90–95° C. The light brown solid which had formed was then filtered off and thoroughly washed with chloroform to give 5.0 g. (100% theoretical yield) of the substantially pure polymeric phosphoramide, not softening below 300° C., insoluble in water and the organic solvents shown in Example 1, and consisting essentially of the repeating unit:

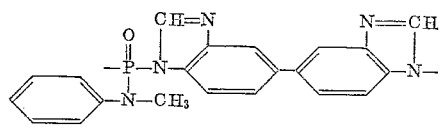

Employing a high pressure, high temperature Bridgman type press, the polymer was molded to give well-dimensioned, coherent molded objects.

Example 3

A solution of 3.00 g. (0.013 mole) of 5,5′-bibenzimidazole and 2 ml. (0.0256 mole) of triethylamine in 50 ml. of dimethylformamide was added to a solution of 3.45 g. (0.013 mole) of diphenylphosphoramidous dichloride in 50 ml. of dimethylformamide. The reaction mixture was stirred under nitrogen and heated on the water bath at 90–95° C. for 2 hours. Upon fractionally cooling there was separated out the substantially pure polymeric phosphoramide, softening at 225–235° C., insoluble in the organic solvents mentioned in Example 1, and consisting essentially of the repeating unit.

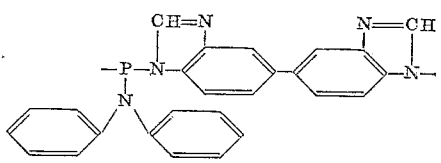

The molten polymer was poured into molds to give hard, smooth casts.

Example 4

To a solution of 2.49 g. (0.013 mole) of phenylphosphonic dichloride in 50 ml. of dimethylformamide there was added a solution of 3.0 g. (0.013 mole) of 5,5′-bibenzimidazole and 2 ml. (0.256+ mole) of triethylamine in 50 ml. of dimethylformamide. Exothermic reaction was evidenced by a 12° C. temperature rise. The reaction mixture was then stirred under nitrogen for 2 hours at 90–95° C. and allowed to cool. The brown solid which had formed was filtered off and washed with chloroform to obtain the substantially pure polymeric phosphonamide, insoluble in the organic solvents shown in Example 1, not softening below ca. 280° C., and consisting essentially of the repeating unit:

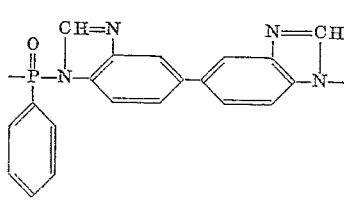

The polymer was molded in a high pressure, high temperature press to give coherent molded pieces of good mechanical and thermal stability.

What we claim is:

1. A solid, resinous polymeric phosphorus amide consisting essentially of the repeating unit

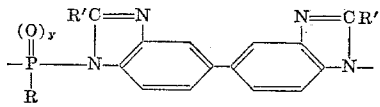

where R is selected from the class consisting of hydrocarbon radicals which are free of olefinic and acetylenic unsaturation and contain from 1 to 12 carbon atoms and (hydrocarbon)$_2$N— where the hydrocarbon radical is as herein defined, y is zero or one, and R′ is selected from the class consisting of hydrogen and alkyl radicals of 1 to 5 carbon atoms.

2. A solid, resinous polymeric phosphorus amide consisting essentially of the repeating unit

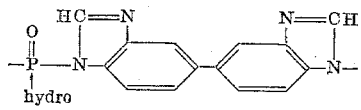

in which hydro denotes a hydrocarbon radical which is free of olefinic and acetylenic unsaturation and contains from 1 to 12 carbon atoms.

3. A solid, resinous polymeric phosphorus amide consisting essentially of the repeating unit

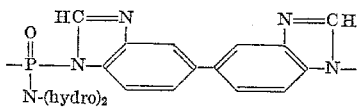

in which hydro denotes a hydrocarbon radical which is free of olefinic and acetylenic unsaturation and contains from 1 to 12 carbon atoms.

4. A solid, resinous polymeric phosphorus amide consisting essentially of the repeating unit

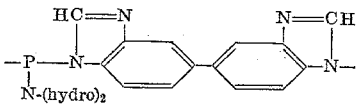

in which hydro denotes a hydrocarbon radical which is free of olefinic and acetylenic unsaturation and contains from 1 to 12 carbon atoms.

5. A solid, resinous polymeric phosphorus amide consisting essentially of the repeating unit

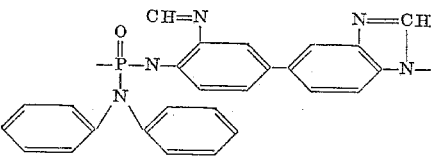

6. A solid, resinous polymeric phosphorus amide consisting essentially of the repeating unit

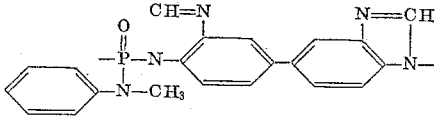

7. A solid, resinous polymeric phosphorus amide consisting essentially of the repeating unit

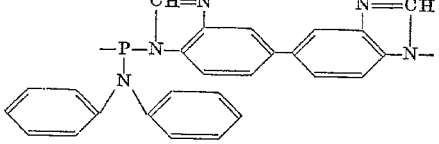

8. A solid, resinous polymeric phosphorus amide consisting essentially of the repeating unit

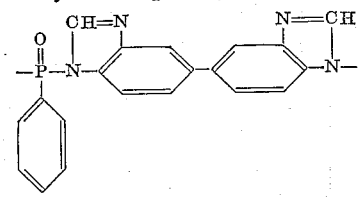

9. The method which comprises heating a dihalophosphorus compound of the formula

where R is selected from the class consisting of hydrocarbon radicals which are free of olefinic and acetylenic unsaturation and contain from 1 to 12 carbon atoms and (hydrocarbon)$_2$N— where the hydrocarbon radical is as herein defined, $y$ is zero or one, and X is selected from the class consisting of bromine and chlorine, with a bibenzimidazole compound of the formula

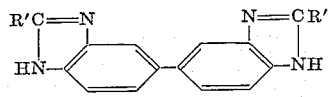

where R' is selected from the class consisting of hydrogen and alkyl radicals of from 1 to 5 carbon atoms, and recovering from the resulting reaction product a solid, resinous polymeric phosphorus amide consisting essentially of the repeating unit

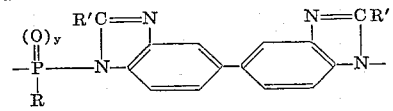

in which R, $y$ and R' are as defined above.

10. The method which comprises contacting a phosphorus dihalide of the formula

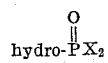

in which hydro denotes a hydrocarbon radical which is free of olefinic and acetylenic unsaturation and contains from 1 to 12 carbon atoms, and X is selected from the class consisting of chlorine and bromine, with 5,5'-bibenzimidazole and recovering from the resulting reaction product a solid, resinous polymeric phosphorus amide consisting essentially of the repeating unit

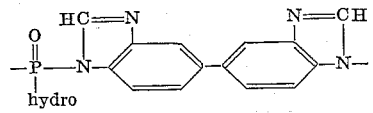

in why hydro is as herein defined.

11. The method which comprises ocntacting a phosphorus dihalide of the formula

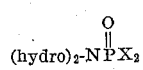

in which hydro denotes a hydrocarbon radical which is free of olefinic and acetylenic unsaturation and contains from 1 to 12 carbon atoms, and X is selected from the class consisting of chlorine and bromine, with 5,5'-bibenzimidazole and recovering from the resulting reaction product a solid, resinous polymeric phosphorus amide consisting essentially of the repeating unit

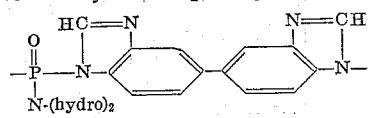

in which hydro is as herein defined.

12. The method which comprises heating 5,5'-bibenzimidazole with diphenylphosphoramidic dichloride and recovering from the reaction product a solid, resinous polymeric phosphorus amide consisting essentially of the repeating unit

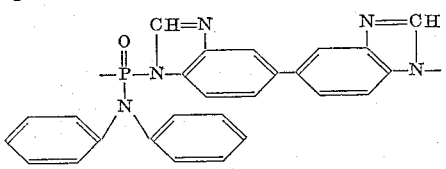

13. The method which comprises contacting 5,5'-bibenzimidazole with methylphenylphosphoramidic dichloride and recovering from the reaction product a solid, resinous polymeric phosphorus amide consisting essentially of the repeating unit

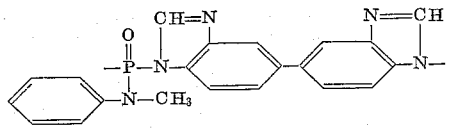

14. The method which comprises contacting 5,5'-bibenzimidazole with diphenylphosphoramidous dichloride and recovering from the reaction product a solid, resinous polymeric phosphorus amide consisting essentially of the repeating unit

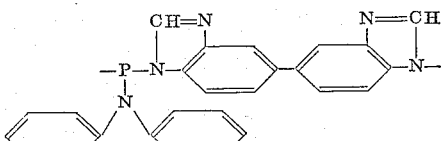

15. The method which comprises contacting 5,5'-bibenzimidazole with phenylphosphonic dichloride and recovering from the reaction product a solid, resinous polymeric phosphorus amide consisting essentially of the repeating unit

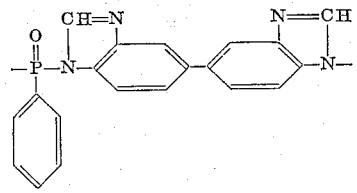

16. A compound of the formula

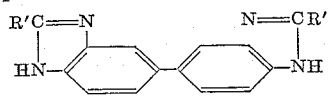

in which R' is selected from the class consisting of hydrogen and alkyl radicals of from 1 to 5 carbon atoms.

17. 5,5'-bibenzimidazole.

References Cited by the Examiner

UNITED STATES PATENTS 2,895,948   7/59   Brinker et al. _____ 260—78.4

FOREIGN PATENTS 1,243,608   9/60   France.

OTHER REFERENCES

Whitmore: Organic Chemistry, D. Van Nostrand Company, New York, 1951, second edition, page 652 relied upon.

WILLIAM H. SHORT, *Primary Examiner.*

J. R. LIBERMAN, *Examiner.*

UNITED STATES PATENT OFFICE
CERTIFICATE OF CORRECTION

Patent No. 3,173,886                  March 16, 1965

Robert Z. Greenley et al.

It is hereby certified that error appears in the above numbered patent requiring correction and that the said Letters Patent should read as corrected below.

Column 4, line 24, for "5,5′-bisbenzimidazole" read -- 5,5′-bibenzimidazole --; column 5, line 2, for "5,5′-dibenzimida-" read -- 5,5′-bibenzimida- --; column 6, lines 51 to 58 and column 6, lines 61 to 66, for that portion of each formula reading

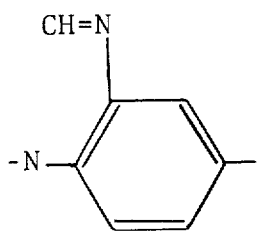     read     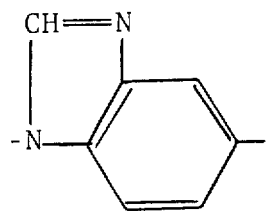

column 7, line 55, for "why" read -- which --; line 56, for "ocntacting" read -- contacting --; column 8, lines 51 to 54, the formula should appear as shown below instead of as in the patent:

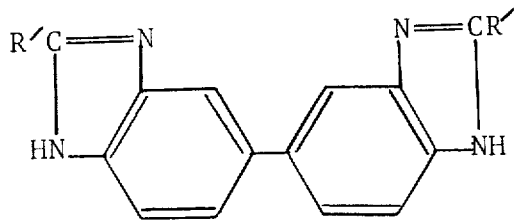

Signed and sealed this 14th day of September 1965.

(SEAL)
Attest:

ERNEST W. SWIDER                      EDWARD J. BRENNER
Attesting Officer                     Commissioner of Patents